United States Patent [19]
Townsend et al.

[11] Patent Number: 5,661,719
[45] Date of Patent: Aug. 26, 1997

[54] METHOD FOR ACTIVATING A BACKUP NETWORK MANAGEMENT STATION IN A NETWORK MANAGEMENT SYSTEM

[75] Inventors: Robert L. Townsend, Sioux City, Iowa; Luo-Jen Chiang, Freehold, N.J.

[73] Assignee: NCR Corporation, Dayton, Ohio

[21] Appl. No.: 545,465

[22] Filed: Oct. 19, 1995

[51] Int. Cl.[6] ........................................ H04L 1/22
[52] U.S. Cl. ........................................ 370/216; 370/221
[58] Field of Search ................ 370/16, 16.1, 94.1–94.3, 370/60, 60.1, 13, 24, 216, 221, 222, 223, 217, 218, 219, 220; 455/8; 340/825.01, 827, 825.07, 825.52; 364/187; 395/180, 181, 189.01, 182.02, 182.04, 182.08, 182.09, 182.11

[56] References Cited

U.S. PATENT DOCUMENTS

| | | | |
|---|---|---|---|
| 4,918,598 | 4/1990 | Ashkin et al. | 364/200 |
| 5,226,152 | 7/1993 | Klug et al. | 395/575 |
| 5,233,602 | 8/1993 | Kuwano | 370/24 |
| 5,381,414 | 1/1995 | Gibson | 370/94.2 |
| 5,408,649 | 4/1995 | Beshears et al. | 395/575 |

*Primary Examiner*—Douglas W. Olms
*Assistant Examiner*—Ajit Patel
*Attorney, Agent, or Firm*—Ying Tuo

[57] ABSTRACT

A network management system includes at least two network management stations. One of the stations is set as a main network management station, and the other is set as a backup network management station. The data packets are delivered to the two network management stations simultaneously. When the main network management station is in proper operational condition, it is set in an active mode by activating its IP and MAC addresses to the addresses that are assigned to it, and the backup network management station is set in an inactive mode by deactivating its IP and MAC addresses, so that only the main network management station can act upon the incoming data packets. When the main network management station is about to fail, the backup network station is set to the active mode by activating its IP and MAC addresses to the addresses that have been assigned to the main network management station, so that it can act upon the incoming data packets after the main network management station has failed.

20 Claims, 3 Drawing Sheets

METHOD FOR ACTIVATING A BACKUP NETWORK MANAGEMENT STATION IN A NETWORK MANAGEMENT SYSTEM

BACKGROUND OF THE INVENTION

This invention generally relates to network management systems, and more particularly to a network management system having more than one network management work station with at least one of which being used as a backup management work station.

In selecting a specific type of computer system for a network management system, reliability is a key concern.

Usually, a smaller computer system, such as SUN Sparc work station, HP 3000 work station or AT&T GIS 3350 work station, is less reliable than a larger computer system, such as HP 9000 computer or IBM 3090 computer, because a smaller computer system may lack built-in redundancy features. To enhance the reliability when small computer systems are used, network management systems store data in Redundant Array Inexpensive Disks (RAID), where several inexpensive disks contain the same data and operate in parallel fashion. In operation, even if one or more inexpensive disks fail, the network management systems can still properly function.

To further enhance the reliability, more than one network management station can be connected to the RAID.

FIG. 1 depicts a network management system including two work stations 102 and 104, RAID 118, and front-end processor 122. Work stations 102 and 104 are connected to RAID 118 and front-end processor 112. Terminals 1–n are connected to network 126 and able to send data packets to stations 102 or 104 via front-end Processor 122. Work station 102 or 104 can receive and store incoming data packets into RAID 118.

In operation, work station 102 can be chosen to serve as a main network management station, and work station 105 as a backup network management work station. When work station 102 is in proper operational condition to receive the incoming data packets containing network management information, it is not desirable for station 104 to receive the same incoming data packets, since the network management system requires only a single control station to collect and store the necessary network management information. Thus, front-end processor 122 is used to direct incoming data packets containing network management information from network 126 to work station 102 when the station is in proper operational condition. Front-end processor 122 switches the incoming data packets containing network management information to work station 104 only when work station 102 fails.

One disadvantage of the scheme shown in FIG. 1 is that a front-end processor is needed, which can be relatively expensive. For example, the current price of a typical front-end processor IBM 3780 is around 100 thousand U.S. dollars.

Another disadvantage of the scheme shown in FIG. 1 is that each of the incoming data packets containing network management information has to be switched by the front-end processor, thus slowing data transmission speed.

Therefore, there has been a need to provide a reliable network management system with reduced cost and improved speed.

SUMMARY OF THE INVENTION

In one aspect, this invention provides a novel method in using with a network management system for managing a network. The network management system includes a first station and a second station. The method includes the steps of:

delivering data, via the network, to the first and second stations, when the first station is in proper operational condition, setting the first station in active mode so that the first station will act upon the data, and when the first station is in proper operational condition, setting the second station in an inactive mode so that the second station will not act upon the data.

The method further includes the step of setting the second station in an active mode when the first station is about to fail, so that the second station will act upon the data after the first station has failed.

It is accordingly an objective of the present invention to provide a reliable network management system without imposing an undue cost.

It is another objective of the present invention to provide a reliable network management system with improved data transmission speed.

BRIEF DESCRIPTION OF THE DRAWING

The features and advantages of the present invention will become apparent to those skilled in the art to which the invention relates from the subsequent description of the preferred embodiments and the appended claims, in conjunction with the accompanying drawing in which:

DETAILED DESCRIPTION OF PREFERRED EMBODIMENTS

Figure 1:
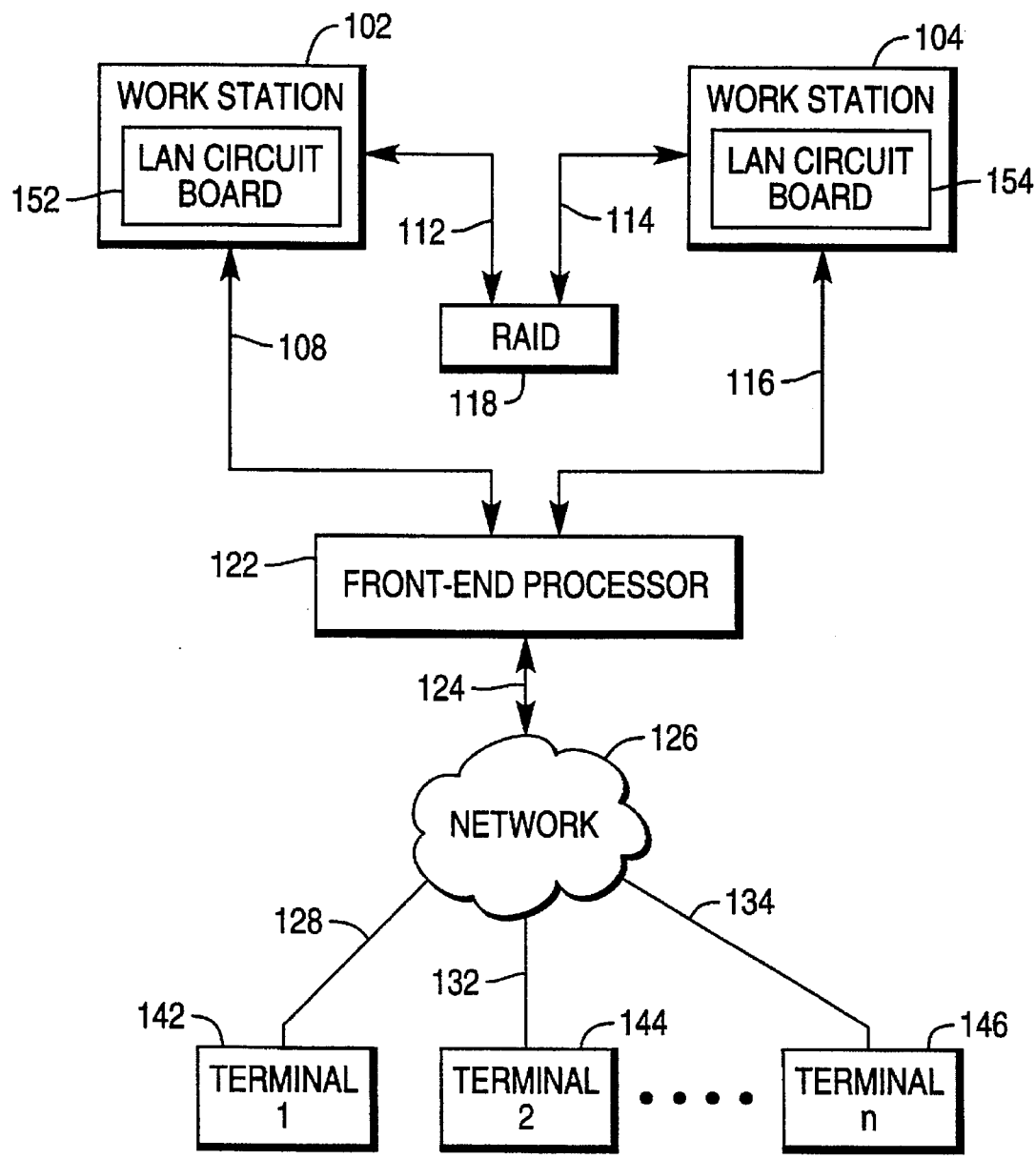
FIG. 1 depicts a conventional network management system.
Figure 2:
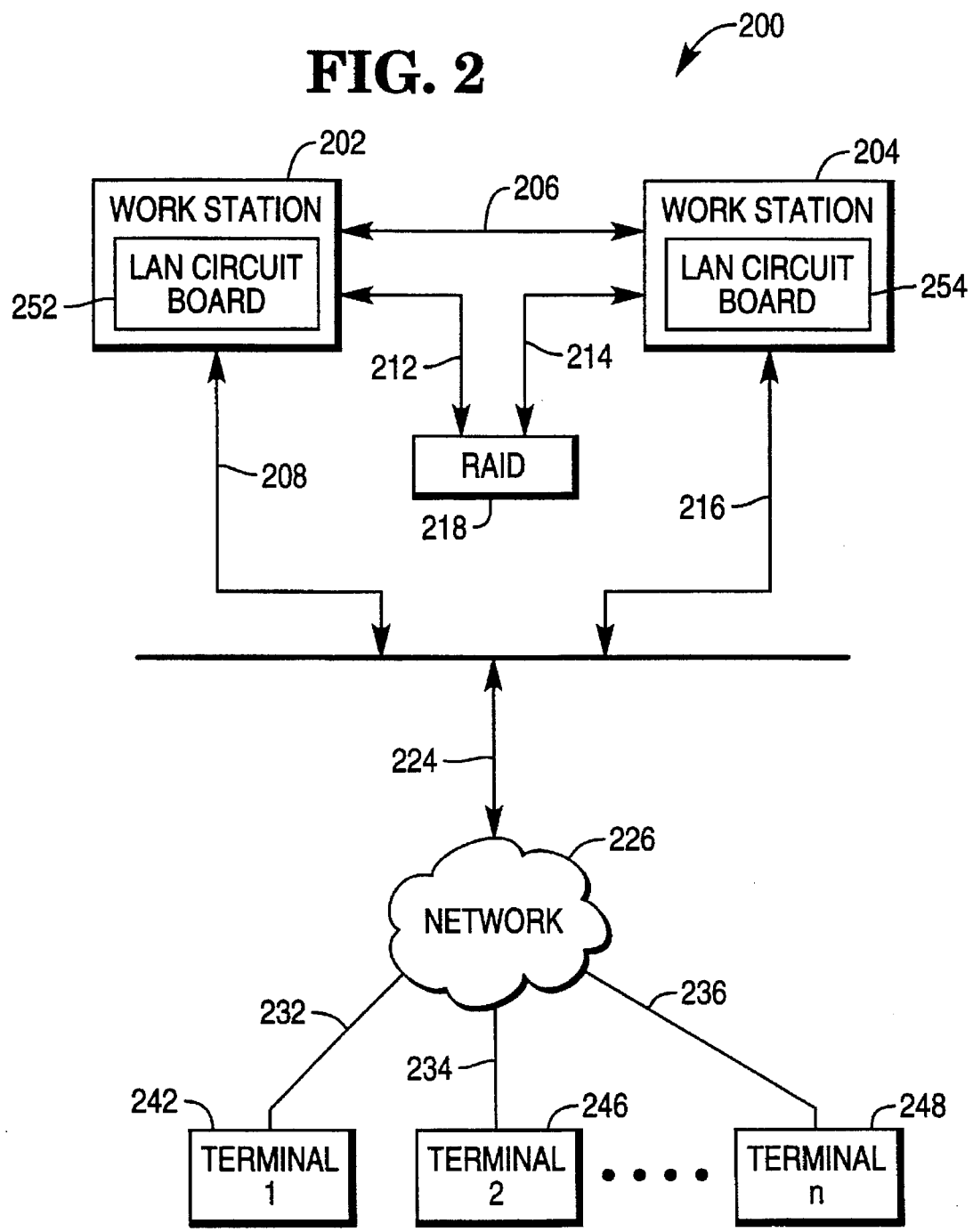
FIG. 2 depicts a network management system, in accordance with the present invention.

FIG. 2 depicts a network management system 200, in accordance with the present invention, which includes work stations 202 and 204, RAID 218, network 226, and terminals 1–n.

Work stations 202 and 204 include LAN circuit boards 252 and 254, respectively. Through their correspondent LAN circuit boards 252 and 254, work stations 202 and 204 can communicate with to network 226, via lines 208 and 216 respectively.

Since work stations 202 and 204 are connected to RAID 218 via lines 212 and 214 respectively, they can both get access to RAID 218. Work stations 202 and 204 are also connected to lines 208 and 216 respectively. To simultaneously deliver data packets from network 226 to work stations 202 and 204, link 224 connects both lines 208 and 216 to network 226.

Being connected to network 226 via lines 232, 234 and 236 respectively, terminals 1–n can send data packets to work stations 202 and 204, via network 226 and link 224.

Link 206 is a physical wire connection between work stations 202 and 204. When work station 202 is about to fail, it will transmit signals from work station 202 to work station 204, to inform the operational status of work station 202.

LAN circuit boards 252 and 254 contain hardware and software to define and identify the IP address and MAC address for the correspondent work stations 202 and 204. (IP stands for Internet Protocol, and MAC stands for Medium Access Control). A work station acts upon an incoming data packet when both the destination IP address and destination MAC address in the data packet match the IP address and MAC address assigned to the work station.

Figure 3:
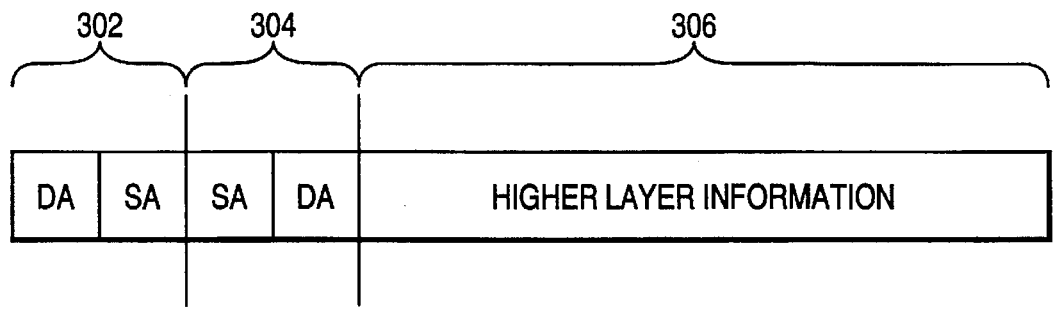
FIG. 3 depicts the format of a typical data packet.

FIG. 3 depicts the format of a typical data packet, including: MAC address section 302 containing destination address (DA) and source address (SA); IP address section 304 containing source address (SA) and destination address (SA); and higher layer information 306, such as E-mail or file transfer carried by TCP (Transmission Control Protocol). The MAC addresses identify the physical addresses of sources and destinations for the work stations connected to the network. And the IP addresses identify the logical addresses of sources and destinations for the work stations connected to the network.

The IP address is managed by the network administrator on behalf of the users.

The MAC address can be pre-configured on the LAN circuit board, and it can also be modified by software.

Both IP and MAC addresses can be modified by the networking administration instructions, such as ifconfig instruction.

Ifconfig instruction is used to assign an address to a network interface and/or to configure network interface parameters. Ifconfig instruction has two formats as follows.

Format I ifconfig interface [address_family] [address [dest_address]] [parameters] [netmask mask] [broadcast address] [metric n]; and Format II ifconfig interface [protocol family]

Ifconfigure instruction must be used at boot time to define the network address of each interface present on a machine; it may also be used at a later time to redefine an interface's address or other operating parameters. The interface parameter is a string of the form name unit, for example "end 1."

Since an interface may receive transmissions in differing protocols, each of which may requires separate naming schemes, the parameters and addresses are interpreted according to the rules of some address family, specified by the address family parameter. The address families currently supported are ether and inet.

For the DARPA (Defense Advanced Research Projects Agency) Internet family (inet), the address is either a host name present in the host name data base, or a DARPA Internet address expressed in the Internet standard dot notation. A typical Internet address is 192.9.200.44, where 192.9.200 is the network number and 44 is the machine's host number.

For the ether address family, the address is an Ethernet address represented as x:x:x:x:x:x, where x is a hexadecimal number between 0 and ff.

If the dest_address parameter is supplied in addition to the address parameter, it specifies the address of the correspondent on the other end of a point to point link.

Referring back to FIG. 2, work station 202 can be chosen as a main network management station, and work station 204 as a backup network management station. When work station 202 is in proper operational condition, work station 202 is set in an active mode, and work station 204 in an inactive mode. Thus, even though incoming data packets (which may contain network management information) are delivered to both work stations 202 and 204 via line 224, only station 202 acts upon the incoming data packets with the IP and MAC addresses matching these on LAN circuit board 252. Acting as the main network management station, work station 202 receives and stores the incoming data packets into RAID 218. However, both stations 202 and 204 can get access to RAID 218 and control the network management system.

When work station 202 is about to fail, a failure routine stored in work station 202 will be invoked to inform the operational status of work station 202 to work station 204.

Figure 4A:
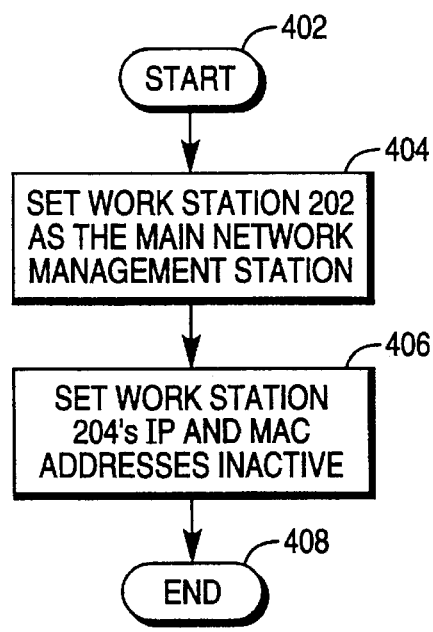
FIG. 4A depicts a flowchart showing the operation when the main network management station is in a proper operational condition, in accordance with the present invention.

FIG. 4A depicts a flowchart, showing the operation when work station 202 is in a proper operational condition, in accordance with the present invention.

In FIG. 4A, step 404 sets work station 202 (shown in FIG. 2) as the main network management station. The IP and MAC address on LAN circuit board 252 (shown in FIG. 2) are arranged to match the physical and logical addresses assigned to work station 202. In the proper operational condition, work station 202 can receive the incoming data packets (which may contain network management information) with the destination IP and MAC addresses matching the physical and logical address assigned to station 202.

Step 406 sets work station 204 in the inactive mode by deactivating the IP and MAC addresses on LAN circuit board 254 (shown in FIG. 2). In this case, the assigned IP and MAC addresses of LAN circuit board 254 are no longer used to identify the work station 204. Thus, in the proper operational condition, work station 204 will not act upon the data packets from link 224. Consequently, even the incoming data packets are delivered on link 224, station 204 will not receive the incoming data packets having the IP and MAC addresses assigned to work station 202.

However, in the proper operational condition, both work stations 202 and 204 can get access RAID 218 and control the network management system.

Figure 4B:
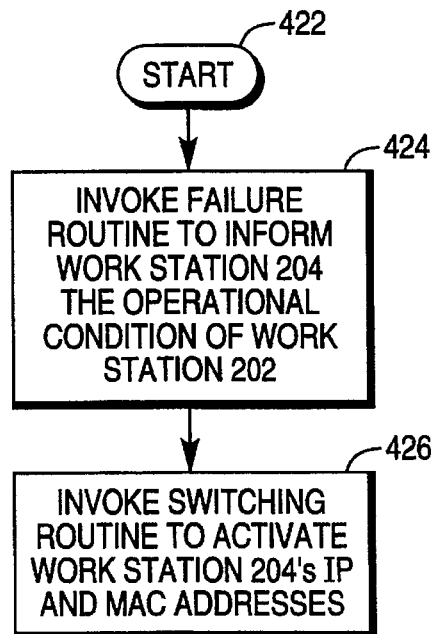
FIG. 4B depicts a flowchart showing the operation when the main network management station is about to fail, in accordance with the present invention.

FIG. 4B depicts a flowchart, showing the operation when work station 202 is about to fail, in accordance with the present invention.

In FIG. 4B, when work station 202 is about to fail, step 424 invokes a failure routine stored in work station 202, such as the PANIC routine in the UNIX operating system, to generate operational status signals. The operational status signals are transmitted to work station 204 via physical link 206.

Learning that work station 202 is about to fail based on the operational status signals, step 426 invokes a switching routine (stored in work station 204) to activate MAC and IP addresses to match the physical and logical the addresses assigned to work station 202 on LAN circuit board 254 (shown in FIG. 2). The switching routine contains an ifconfig instruction to activate the MAC and IP addresses on LAN circuit board 254.

After the IP and MAC addresses have been activated, work station 204 can now act upon the incoming data packets (which may contain network management information) with the IP and MAC addresses matching the physical and logical addresses assigned to station 202. Before work station 202 is recovered, work station 204 receives and stores the incoming data packets into RAID 218.

Figure 4C:
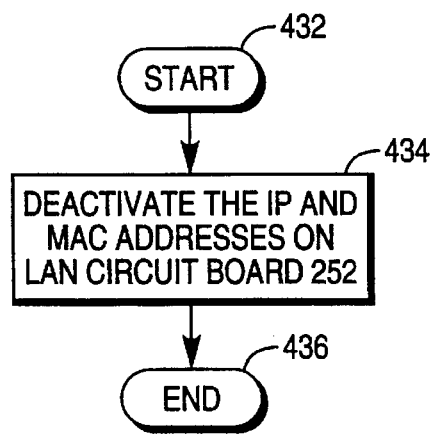
FIG. 4C depicts a flowchart showing the operation when the main network management station is recovered from the failure.

FIG. 4C depicts a flowchart, showing the operation when work station 202 is recovered from the failure, in accordance with the present invention.

After work station 202 is recovered from the failure, step 434 invokes a routine to deactivate the IP and MAC addresses on LAN circuit board 252. Thus, work station 202 will not act upon the incoming data packets on link 224 shown in FIG. 2.

If work station 204 is about to fail, a failure routine stored in work station 204 will be invoked to perform the similar steps as shown in FIG. 4B:

(1) generating operational status signals for work station 204, and sending the operational status signals from work station 204 to work station 202 via physical link 206 (shown in FIG. 2); and (2) invoking a routine stored in work station 202 to re-activating the IP and MAC addresses that have originally assigned to work station 202 on LAN circuit board 252.

It should be noted that the identification of the network management station that receives and processes network management information is always the same, no matter which specific work station actually performs such function.

It should be appreciated that, in activating a backup network management station, the present invention provides a novel method to use features in existing network management software. Specifically, in activating a backup network management station, the present invention creatively uses: (1) the failure routine in existing operating system, (2) the software-configurability of the MAC and IP addresses on existing LAN circuit board, and (3) ifconfig contained in existing network administration instructions.

As such, the present invention provides a cost-effective solution, because the activation of a backup network management station can be implemented by few additional instructions without adding extra hardware.

The present invention also provides fast data packet communication, because the incoming data packets are simultaneously delivered to the both work stations without being switched by a front-end processor.

One advantage of the present invention is to provide redundancy of the network management station without imposing undue hardware and software overhead.

The approach of the present invention is very useful in the situations (banking and financial environments, for example) where the continuing and non-disruptive monitoring of network operations is extremely important, but economy is sometimes also a consideration and limitation.

While the particular embodiments of the present invention have been described in detail, it should be understood that the invention may be implemented through alternative embodiments. Thus, the scope of the invention is not intended to be limited to the embodiments described above, but is to be defined by the appended claims.

What is claimed is:

1. A method in using with a network management system for managing a network, said network management system including a first network management station and a second network management station, said first and second network management stations having their respective network addresses and network addressing means, said method comprising the steps of:

(A) delivering data frames, via said network, to said first and second network management stations, each of said data frames containing a network address;

(B) when said first network management station is in proper operational condition, activating said network addressing means of said first network management station to the network address that has been assigned to said first network management station;

(C) when said first network management station is in proper operational condition, deactivating said network addressing means of said second network management station so that said second network management station will not act upon said data flames; and (D) acting upon said data frames by said first network management Station when said network address contained in said data flames matches the network address assigned to said first network management station.

2. The method of claim 1, said step (A) delivering said data frames simultaneously to said first and second network management stations.

3. The method of claim 1, further comprising the step of:

connecting said first and second network management stations to a Redundant Array Inexpensive Disks (RAID).

4. The method of claim 1, wherein said network address in each of said data frames and said network address assigned to said first network management station includes a logical address section and a physical address section.

5. The method of claim 4, said step (B) activating said physical address section by use of an instruction; and said step (C) deactivating said physical address section by use of an instruction.

6. The method of claim 5, said step (B) activating said logical address section by use of an instruction; and said step (C) deactivating said logical address section by use of an instruction.

7. The method of claim 6, further comprising the step of:

connecting said first and second network management stations to a Redundant Array Inexpensive Disks (RAID), said first and second network management station having access to said RAID.

8. The method of claim 1, further comprising the step of:

(E) when said first station network management is about to fail, activating said network addressing means of said second network management station into the network address that has been assigned to said first network management station; and (F) acting upon said data flames by said second network management station if said network address contained in said data frames matches the network address assigned to said first network management station.

9. The method of claim 8, said network address in each of said data frames and said network address assigned to said first network management station includes a logical address section and a physical address section.

10. The method of claim 9, said step (B) activating said physical address section by use of an instruction;

said step (C) deactivating said physical address section by use of an instruction; and said step (D) activating said physical address section by use of an instruction.

11. The method of claim 10, said step (B) activating said logical address section by use of an instruction;

said step (C) deactivating said logical address section by use of an instruction; and said step (D) activating said logical address section by use of an instruction.

12. The method of claim 1, further comprising the steps of:

(E) when said first network management station is about to fail, invoking a failure routine to inform said second network management station that said first network management station is about to fail; and (F) invoking a switching routine for activating network addressing means of said second network management station so that said second network management station will act upon said data frames that contain network address assigned to said first network management station after said first network management station has failed.

13. The method of claim 12, said failure routine being stored in said first network management station and said switching routine being stored in said second network management station.

14. The method of claim 13, said failure routine being invoked by said first network management station and said switching routine being invoked by said second network management station.

15. The method of claim 12, said network address in each of said data frames and said network address assigned to said first network management station includes a logical address section and a physical address section.

16. The method of claim 15, said step (B) activating said physical address section by use of an instruction;

said step (C) deactivating said physical address section by use of an instruction; and said step (E) activating said physical address section by use of an instruction.

17. The method of claim 16, said step (B) activating said logical address section by use of an instruction;

said step (C) deactivating said logical address section by use of an instruction; and said step (E) activating said logical address section by use of an instruction.

18. The method of claim 17, further comprising the step of: connecting said first and second network management stations to a Redundant Array Inexpensive Disks (RAID).

19. The method of claim 12, said failure routine being stored in said first network management station and said switching routine being stored in said second network management station.

20. The method of claim 19, said failure routine being invoked by said first network management station and said switching routine being invoked by said network management second station.

* * * * *

UNITED STATES PATENT AND TRADEMARK OFFICE
CERTIFICATE OF CORRECTION

PATENT NO. : 5,661,719
DATED : August 26, 1997
INVENTOR(S) : Robert L. Townsend, et al.

It is certified that error appears in the above-indentified patent and that said Letters Patent is hereby corrected as shown below:

Column 6, line 7, delete "flames" and substitute --frames--.

Column 6, line 10, delete "flames" and substitute --frames--.

Column 6, line 45, delete "flames" and substitute --frames--.

Signed and Sealed this

Fourth Day of November, 1997

Attest:

BRUCE LEHMAN

Attesting Officer

Commissioner of Patents and Trademarks